June 22, 1954     J. L. DE LYRA     2,681,825
GLARE SHIELD FOR MOTOR VEHICLES AND THE LIKE
Filed Dec. 4, 1952

JANE L. DE LYRA
INVENTOR

BY
ATTORNEY

Patented June 22, 1954

2,681,825

UNITED STATES PATENT OFFICE 2,681,825

GLARE SHIELD FOR MOTOR VEHICLES AND THE LIKE

Jane L. De Lyra, New York, N. Y.

Application December 4, 1952, Serial No. 324,022

3 Claims. (Cl. 296—97)

This invention relates to a glare shield for motor vehicles and the like.

Virtually all motor vehicles are provided with adjustable sun shields which protect the driver from the glare of the sun when the sun is low. These sun shields are generally rectangular in shape and they extend across a part of the windshield directly in front of the driver. Sometimes a second sun shield is provided to the right of the driver where a passenger would sit. These sun shields are normally made of opaque material to prevent the transmission of any light whatsoever. These sun shields are not at all helpful when the sun is very low since it is not possible to lower them sufficiently to block out the sun's rays and at the same time to allow the driver to see how to drive. This is also true of night driving since opaque sun shields can be of no assistance whatsoever in protecting the driver against the glare of the headlights of oncoming motor vehicles.

It is one object of this invention to provide a glare shield which will afford complete protection against the glare of the sun, either directly or reflected from a snow covered road, and also against the glare of the headlights of opposing traffic at night. The glare shield which is herein described and claimed is made of light transmitting material so that the driver may see through it in order to drive. However, it is either colored or otherwise treated in order to subdue the bright glare of the sun or of bright headlights in substantially the same manner as the same result is achieved through the use of sun glasses. The glare shield herein claimed may be lowered until it is directly interposed between the eyes of the driver and the road ahead and yet it will not obscure the driver's vision nor interfere with his ability to drive in any way whatsoever.

Conventional sun shields are mounted for pivotal movement on a horizontal axis which is transverse to the longitudinal axis of the vehicle. The sun shield may be made to pivot upwardly against the ceiling or downwardly to any desired position behind the windshield. Sometimes there is a further adjustment whereby the sun shield and its supporting rod on which it pivots are both movable to the side of the vehicle in order to protect against the rays of the sun coming in through the side window. But whether there is the one adjustment or both adjustments, there always appears to be an unprotected area between the sun shield and the corner post of the motor vehicle to which said shield is adjacent. This unprotected area is extremely troublesome since sun rays entering the vehicle through said unprotected area are equally as bothersome and hazardous as sun rays entering the vehicle through any other part of the windshield in front of the driver.

It is therefore another object of this invention to provide an auxiliary glare shield which pivots on an axis which is substantially perpendicular to the axis on which the principal glare shield swings. This auxiliary shield is also made of light transmitting material with such qualities as prevent the glare of the light from interfering with the driver's vision. The auxiliary shield is swingable on an off-center axis so as to cover a greater or lesser area to the side of the principal glare shield. It is situated in the unprotected area above mentioned and it is adapted to cover more or less of that area or all of it, as desired.

A preferred form of this invention is shown by way of illustration in the accompanying drawing in which.

Figure 1:
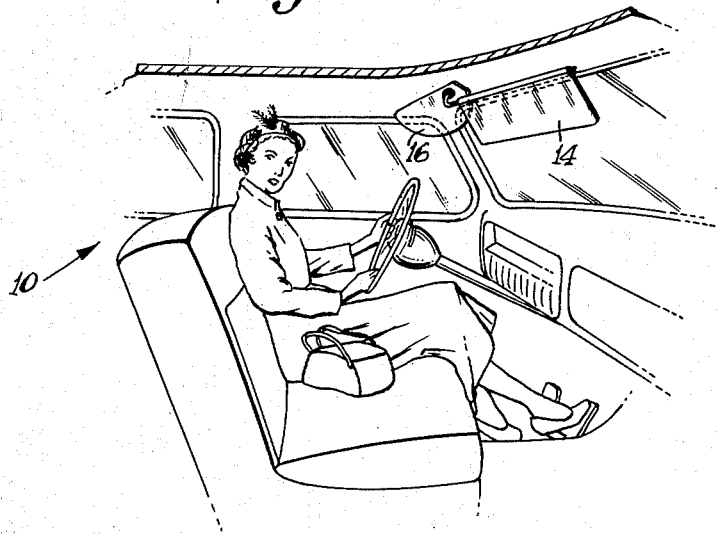
Fig. 1 is a perspective view showing the glare shield herein claimed installed in a conventional automobile.
Figure 2:
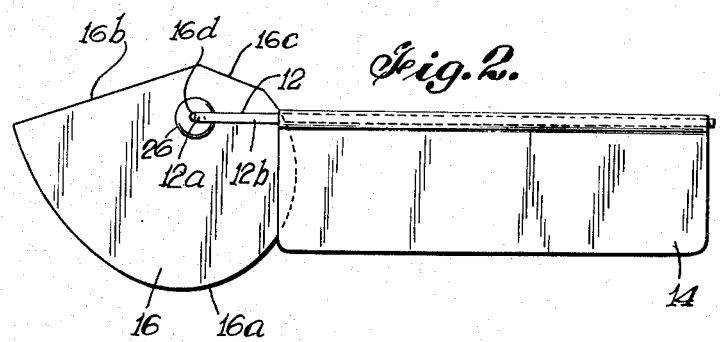
Fig. 2 is a view thereof as seen by the driver of the automobile.
Figure 3:
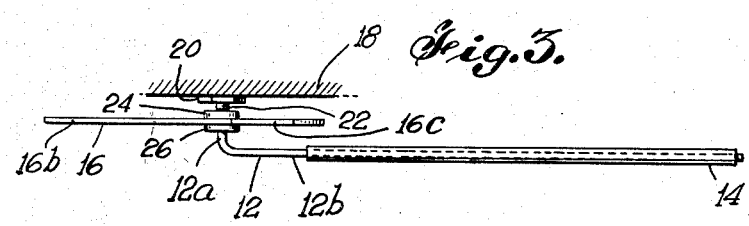
Figure 3 is a top view of said shield, showing the relationship between the main shield member and the auxiliary shield member and how they are mounted on a common rod and yet on axes which intersect each other substantially at right angles.

Referring now to Fig. 1, it will be seen that a conventional automobile 10 is illustrated as typical of all of the various kinds of vehicles to which the present invention may be applied. Figs. 2 and 3 clearly show the construction of this invention. L-shaped rod 12 is the support for both the main glare shield 14 and the auxiliary glare shield 16. The short portion 12a of said rod is secured in conventional manner to the framework 18 of the automobile, as by means of a plate 20 to which said rod is welded or otherwise secured and which in turn is screwed or otherwise fastened to said framework 18. This is but one form of mounting for the L-shaped rod and it is intended to illustrate rather than limit the application of this invention. In other forms of mounting the L-shaped rod may be swingably rather than fixedly secured to the framework of the vehicle. The particular location which is best suited for the purposes of this invention is adjacent or even on the corner post of the vehicle which is situated at the driver's end of the windshield.

Main shield 14 is swivelly mounted on the long arm 12b of L-shaped rod 12. It is swivelly movable either upwardly in the direction of the ceiling or downwardly and forwardly in the direction of the windshield, such swivelling movement being on the longitudinal axis of said long arm 12b of said L-shaped rod. It will be noted that there is a space, which varies in different installations, between the left end of main shield 14 (as viewed in Fig. 3) and the short arm 12a of rod 12. It is this space to which reference has above been made as being outside of the protection of conventional sun shields and it is clearly outside the protection of main shield 14.

It will be noted in Fig. 3 that auxiliary glare shield 16 is mounted on short arm 12a of the L-shaped rod. A portion of said short arm is provided with screw threads 22 and a pair of threaded collars or nuts 24 and 26 are mounted on said short arm in engagement with said screw threads. These threaded collars or nuts flank the auxiliary glare shield 16 and serve as stop members to prevent movement of said auxiliary shield axially of said short arm 12a. These two threaded collars or nuts also function for adjustment purposes to adjust the position of the auxiliary shield along the axis of said short arm 12a. Furthermore, these collars or nuts serve as frictional elements which frictionally engage the two sides of the auxiliary glare shield to frictionally hold said shield in any selected position about the axis of said short arm 12a. Said collars or nuts may also be adjusted to provide greater or lesser pressure upon the sides of the auxiliary shield in order to provide greater or lesser resistance to any turning movement thereof. Rubber washers may be provided between the collars or nuts on the one hand and the side surfaces of the auxiliary shield on the other hand. This would supply adequate frictional restraint to prevent accidental turning movement of said auxiliary shield without causing injury to the auxiliary shield of the type that might be caused by unprotected nuts or metal collars or the like.

It will be seen in Fig. 2 that auxiliary shield 16 is somewhat irregular in shape. It may best be described as being fan-shaped. It is provided with a relatively long curved edge 16a, a considerably shorter straight edge 16b and a second straight edge 16c which is even shorter than 16b. The two straight edges meet at an obtuse angle. The opposite end of straight edge 16b meets one end of the curved edge at an angle which approximates 90°. The opposite edge of straight edge 16c meets the opposite end of curved edge 16a at an obtuse angle which roughly approximates the obtuse angle which separates the two straight edges. A hole 16d is provided in the auxiliary shield to accommodate the short arm 12a of the L-shaped rod and it will be noted that said hole is situated adjacent the point of intersection between straight edges 16b and 16c and equidistant from said straight edges on lines which extend from said hole at right angles to said straight edges. It will thereby be seen that hole 16d is situated off-center to provide a greater area between it and the curved edge of the auxiliary shield than between said hole and the two straight edges of said shield.

Consequently, auxiliary shield 16 may be turned about the axis of short arm 12a in order to shift its protection against the glare of the sun or of headlights from one position or location to another, depending upon where its protection is most needed.

The fan-shaped auxiliary shield 16 and the substantially rectangular main shield 14 are both made of light transmitting material. A suitable material for this purpose would be Lucite of E. I. duPont de Nemours & Co., Inc. or Plexiglas of Rohm & Haas Co. These materials are methyl methacrylate plastics which are strong and transparent and capable of being colored to whatever color would best be suited for the purposes of this invention. Green is a good color for this purpose but other colors may also be found suitable, such as amber. Other materials may also be found suitable for the purposes of this invention.

The foregoing is illustrative of a preferred form of this invention and it will be clearly understood that this preferred form may be modified and other forms may be provided within the broad spirit of the invention and the broad scope of the claims.

I claim:

1. A glare shield of the character described, comprising an L-shaped rod, a main shield member swivelly mounted on the long arm of said L-shaped rod and an auxiliary shield member swivelly mounted on the short arm of said L-shaped rod, said auxiliary shield member being fan-shaped and provided with an off-center hole which accommodates the short arm of the L-shaped rod to enable said auxiliary shield member to swivel about the axis of said short arm, said short arm being provided with screw threads and nuts on said screw threads which accommodate the auxiliary shield member between them in order to frictionally hold said auxiliary shield member in any selected position about the longitudinal axis of said short arm.

2. A glare shield in accordance with claim 1, wherein the two shield members are made of transparent plastics colored to subdue the glare of bright lights.

3. A glare shield in accordance with claim 1, wherein the main shield member is substantially rectangular in shape, said main shield member being swivelly mounted along one of its long edges on the long arm of the L-shaped rod so as to enable said main shield member to swivel about its said long edge and about the longitudinal axis of said long arm of the L-shaped rod.

References Cited in the file of this patent

UNITED STATES PATENTS

| Number | Name | Date |
| --- | --- | --- |
| 1,391,915 | Starr et al. | Sept. 27, 1921 |
| 1,898,276 | Van Dresser | Feb. 21, 1933 |
| 2,204,691 | Olsen | June 18, 1940 |
| 2,264,603 | Westrope | Dec. 2, 1941 |
| 2,549,395 | Short, Sr. | Apr. 17, 1951 |
| 2,634,161 | Beets | Apr. 7, 1953 |

FOREIGN PATENTS

| Number | Country | Date |
| --- | --- | --- |
| 323,856 | Great Britain | Jan. 16, 1930 |